US 12,155,207 B1

United States Patent
Murray (10) Patent No.: US 12,155,207 B1
(45) Date of Patent: Nov. 26, 2024

(54) POWER GENERATION IN A PRESENCE OF A TRANSIENT LOAD(S)

(71) Applicant: James Emmett Murray, Hudson, OH (US)

(72) Inventor: James Emmett Murray, Hudson, OH (US)

(73) Assignee: James Emmett Murray, Hudson, OH (US)

( * ) Notice: Subject to any disclaimer, the term of this patent is extended or adjusted under 35 U.S.C. 154(b) by 0 days.

(21) Appl. No.: 18/398,621

(22) Filed: Dec. 28, 2023

Related U.S. Application Data (60) Provisional application No. 63/536,375, filed on Sep. 1, 2023.

(51) Int. Cl.
  *H02J 3/00* (2006.01)
  *H02J 3/38* (2006.01)
  *H02J 3/40* (2006.01)

(52) U.S. Cl.
  CPC .......... *H02J 3/00125* (2020.01); *H02J 3/381* (2013.01); *H02J 3/40* (2013.01)

(58) Field of Classification Search
  CPC .. H02J 3/00125; H02J 3/00; H02J 3/38; H02J 3/381; H02J 3/40
  See application file for complete search history.

(56) References Cited

U.S. PATENT DOCUMENTS

| | | | |
|---|---|---|---|
| 7,030,593 B2 | 4/2006 | Pinkerton et al. |
| 8,022,572 B2 | 9/2011 | Vyas et al. |
| 9,312,699 B2 | 4/2016 | Taimela et al. |
| 10,574,055 B2 | 2/2020 | Yang et al. |
| 11,515,704 B2 | 11/2022 | Du et al. |

FOREIGN PATENT DOCUMENTS

| | | |
|---|---|---|
| GB | 2597524 A | 2/2022 |

OTHER PUBLICATIONS

Leuchter et al., Dynamic Behavior of Mobile Generator Set with Variable Speed and Diesel Engine, 2007 IEEE Power Electronics Specialists Conference, Orlando, FL, USA, 2007, pp. 2287-2293, doi: 10.1109/PESC.2007.4342366.

*Primary Examiner* — Robert L Deberadinis
(74) *Attorney, Agent, or Firm* — Daugherty & Del Zoppo, Co., LPA (57) ABSTRACT

A system includes a first AC power meter configured to measure a first real AC power at an output of a source of AC power on an AC power line. The system further includes an energy storage system configured to at least supply AC power to the AC power line. The system further includes a second AC power meter configured to measure a second real AC power at a junction between the energy storage system and an AC power line. The system further includes a first direct AC electrical path from the energy storage system through the second AC power meter to the AC power line. The system further includes a controller configured to control the source of the AC power to the AC power line based on the measured first and second real power to maintain the target AC power level on the AC power line.

20 Claims, 9 Drawing Sheets

POWER GENERATION IN A PRESENCE OF A TRANSIENT LOAD(S)

TECHNICAL FIELD

The following generally relates to power generation in a presence of a transient load(s).

BACKGROUND

An electric power grid is an interconnected network for transmission and delivery of alternating current (AC) electric power from producers to consumers. An example of such a power grid includes a power plant(s) (e.g., coal, nuclear, hydro, etc.) that produces electric power, electrical substations to step voltage up or down electric power, transmission to carry electric power long distances, and electric power distribution to individual customers, where voltage is stepped down again to the required service voltage(s). Such an electric power grid has also been referred to as a Utility or a central grid in the United States of America.

Although electric power grids are widespread in many countries, some regions do not have access to an electric power grid. In such a region, a combination of an AC power generator and a motor/engine, known as an engine-generator set or a gen-set, has been used to generate and supply AC power. An example gen-set may be, e.g., located as a fixed installation, part of a mobile device such as a trailer, a vehicle, etc., and/or portable. A gen-set can also be used in a region that has access to an electric power grid, e.g., where electricity is temporarily needed such as a construction site, for an emergency situation, as backup power, for a military application, etc.

In some instances, providing a stable and undisturbed source of AC power can be a critical aspect of power generation, and the sensitivity of a load(s) to the power quality can be of extreme importance, e.g., with clocks, computers, etc. While electric power grid power generally represents a virtually infinite source of power where the impact of a load(s) is practically negligible, the ability of a gen-set to provide a stable power supply can be directly impacted by a load(s). For example, applying/increasing or removing/decreasing the load(s) to a power grid can result in variations in the supply voltage and/or frequency available to the load(s).

Figure 1A:
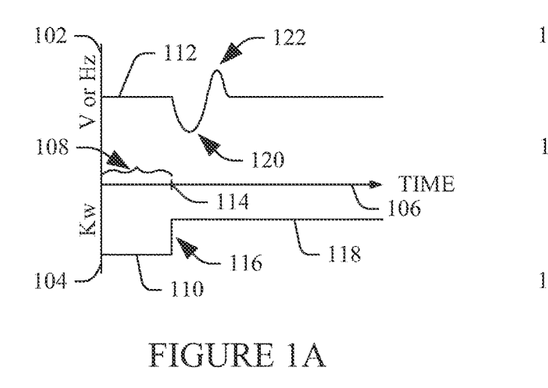
FIG. 1A graphically illustrates an example of possible impact of an applied or increased load on generated AC power.
Figure 1B:
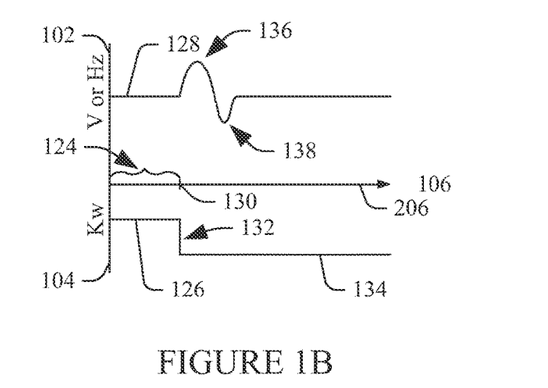
FIG. 1B graphically illustrates an example of possible impact of a removed or decreased load on generated AC power.

FIG. 1A graphically illustrates an example possible impact of an applied or increased load on the generated AC power, and FIG. 1B graphically illustrates an example possible impact of a removed or decreased load on the generated AC power. With both FIGS. 1A and 1B, a first axis 102 represents voltage (e.g., in units of volts, or V) or frequency (e.g., in units of Hertz, or Hz), a second axis 104 represents power draw of a load (e.g., in Kilowatts, or Kw), and a third axis 106 represents time.

In FIG. 1A, during a time period 108, the gen-set is operating at steady state, the load power draw is at a first level 110 (which is zero when there is no load), the voltage or frequency are at rated/nominal conditions 112, and only small variations in the voltage or frequency will be seen. At time 114, a change in the load 116 results in increased power draw to a second level 118, which causes a drop 120 in the voltage or the frequency. The gen-set responds to return the output voltage or frequency back to the rated/nominal conditions 112. There may be overshoot 122 followed by ringing (not illustrated).

In FIG. 1B, during a time period 124, the gen-set is operating at steady state, the load power draw is at a first level 126, the voltage or frequency are at rated/nominal conditions 128, and only small variations in the voltage or frequency will be seen. At time 130, a change in the load 132 results in decreased power draw to a second level 134, which causes a rise 136 in the output voltage or the frequency. The gen-set responds to return the voltage or the frequency back to the rated/nominal conditions 128. There may be overshoot 138 followed by ringing (not illustrated).

An approach to provide a stable source of power in the presence of such transient loads includes adding a power converter to the system in the AC power line to grid and an output power frequency variation detector. An example of such a power converter includes an AC to direct current (DC) converter to convert the AC voltage from the get-set to a DC voltage, an energy storage unit to add or remove DC voltage, and a DC to AC converter to convert the adjusted DC voltage to an AC voltage. The frequency variation detector detects variations in the output frequency and utilizes the converter to maintain system frequency requirements during transient loads.

Unfortunately, such an approach has added complexity and cost to the overall system. For example, the complexity of the combination of an AC to DC solid state conversion, an energy storage unit, and a DC to AC solid state inverter could exceed the cost of the rest of the system. In addition, the system would not have high efficiency in terms of Kw output/Kw of power in the fuel required to generate the power. As such, there is an unresolved need for an improved approach to power generation in a presence of a transient load(s).

SUMMARY

Aspects of the application address the above matters, and others.

In one aspect, a system includes a first AC power meter configured to measure a first real AC power at an output of a source of AC power on an AC power line. The system further includes an energy storage system configured to at least supply AC power to the AC power line. The system further includes a second AC power meter configured to measure a second real AC power at a junction between the energy storage system and an AC power line. The system further includes a first direct AC electrical path from the energy storage system through the second AC power meter to the AC power line. The system further includes a controller configured to control the source of the AC power to the AC power line based on the measured first real power and the measured second real power to maintain the target AC power level on the AC power line.

In another aspect, a method includes measuring a first real AC power at an output of a source of AC power for an AC power line. The method further includes supplying AC power from an energy storage system to the AC power line. The method further includes measuring a second real AC power at a junction between the energy storage system and the AC power line. The method further includes controlling the source of the AC power to the AC power line based on the measured first real power and the measured second real power to maintain a target AC power level on the AC power line.

In yet another aspect, a computer-readable storage medium storing instructions that when executed by a computer cause the computer to: measure a first real AC power at an output of a source of AC power for an AC power line, measure a second real AC power at a junction between an energy storage system and the AC power line, and control the source of the AC power to the AC power line based on the measured first real power and the measured second real power to maintain a target AC power level on the AC power line.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

Figure 2:
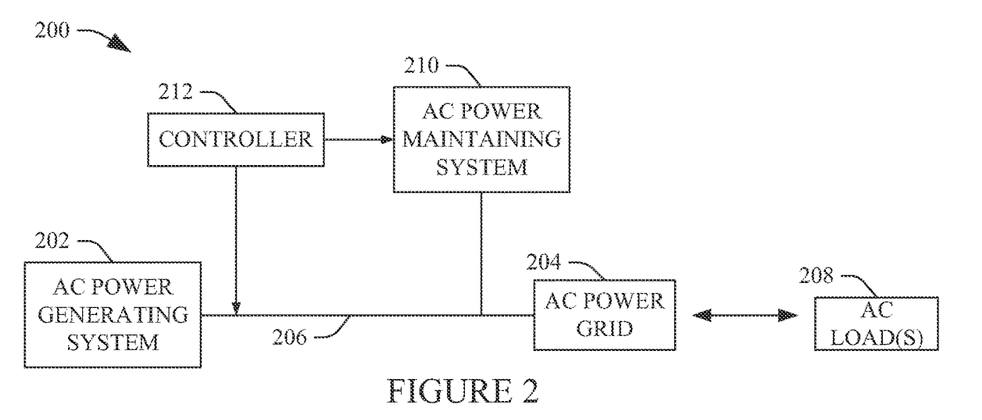
FIG. 2 schematically illustrates an example system, in accordance with an embodiment(s) herein.

FIG. 2 schematically illustrates an example system. The system 200 includes an AC power generating system 202. A non-limiting example of the AC power generating system 202 includes a fuel, nuclear, and/or renewable energy based AC generator(s). An example fuel based AC generator may be based on fuels such as, but are not limited to, solid (e.g., wood, coal, peat, dung, coke, charcoal, etc.), liquid (e.g., petroleum, diesel, gasoline, kerosene, ethanol, etc.), and/or gaseous (e.g., natural gas, hydrogen, propane, methane, etc.) fuels. An example renewable energy based AC generator may utilize renewable energy sources such as, but are not limited to, solar, wind, hydro, biomass, hydrogen, and/or geothermal.

In one embodiment, the AC power generating system 202 is configured to provide 3-phase AC 120/208 V, 277/480 V, 120/240 V, 240 V, 480 V, etc. at 60 Hz in connection with the voltages and frequencies in the United States of America. In another embodiment, the AC power generating system 202 is configured to provide single-phase AC 120 V, etc. at 60 Hz in connection with the voltages and frequencies in the United States of America. Other voltages and/or frequencies are contemplated herein. For example, different countries have different voltages and frequencies standards, and the AC power generating system 202 is configured for its corresponding country. The AC power generating system 202 can be a primary source and/or a backup source of power.

The system 200 further includes an AC power grid 204. In one instance, the AC power generating system 202 supplies power to the AC power grid 204 and/or other power grid via an AC power line 206 and/or other power line. The AC power grid 204 is configured to provide AC power for an AC based load(s) 208. Examples of the load(s) 208 include, but are not limited to, equipment and/or machines such as a computer, a clock, an appliance, a power tool, a pump, a crane, and/or other equipment and/or machine that may be sensitive to changes in power from the power grid 204 and/or include a transient load such as a drill. In one instance, the load(s) is removably connected to the AC power grid 204, e.g., via an AC power plug/socket connection, etc. In another instance, the load(s) 208 is fixedly attached to the AC power grid 204 and not readily detachable.

The system 200 further includes an AC power maintaining system 210 and a controller 212, which are configured at least to mitigate voltage and frequency power variations on the AC power line 206 and/or at the AC power grid 204, e.g., due to transient loads. As discussed herein, a transient load includes an increase in a load due to an addition of a load or an increase in an existing load, etc., and/or a decrease in a load due to the removal of or decrease in an existing load, etc., and, depending on the size of the increase or decrease, may cause the AC power line 206 and/or at the AC power grid 204 to vary, e.g., as shown in FIGS. 1A and 1B, until the AC power generating system 202 adjusts or adapts to the new AC power demand.

In one non-limiting instance, the system 200 is configured to mitigate voltage variations outside of a predetermined range around the nominal voltage. The predetermined range may depend on the application in which the system 200 is providing power for. Examples of ranges include, but are not limited to, 1%, 3.1%, 5.5%, 13.2%, 15%, lower, greater or in between. By way of non-limiting example, in one instance, the system 200 is configured to mitigate voltage variations outside of +10% of the nominal voltage (e.g., for a nominal voltage of 120 V, the AC power maintaining system 210 would increase or decrease the voltage when the output AC power fell outside of 108 V or 132 V).

Additionally, or alternatively, the system 200 is configured to mitigate frequency power variations on the AC power line 206 outside of a predetermined range around a frequency set point. The predetermined range may depend on the application in which the system 200 is providing power for. Examples of ranges include, but are not limited to, 1.5%, 3.8%, 5%, 13.2%, 15%, lower, greater or in between. By way of non-limiting example, in one instance, the system 200 is configured to mitigate frequency power variations outside of +10% of the frequency set point (e.g., for a frequency set point of 60 Hz, the AC power maintaining system 210 would increase or decrease the voltage when the frequency of output AC power fell outside of 57 Hz or 63 Hz).

As described in greater detail below, in one instance the controller 212 monitors real power at various points in the AC power line 206 and controls the AC power generating system 202 and/or the AC power maintaining system 210 based on the monitored real power to mitigate variations in the AC power in the AC power line 206 and/or at the AC power grid 204 due to transient loads. In one instance, the combination of the AC power maintaining system 210 and the controller 212 reduces overall system complexity and cost of the system 200 relative to a configuration in which the system 200 instead includes a power converter (AC to DC and DC to AC) and a frequency variation detector. That is, the embodiments described herein do not require a power converter, such as the power converter described in the background section and/or other power converter. However, such a power converter can be employed with the one or more of the embodiments described herein. In addition, the system 200 improves efficiency in terms of Kw output/Kw of power in the fuel required to generate the AC power where the AC power generating system 202 includes a fuel based power source.

Figure 3:
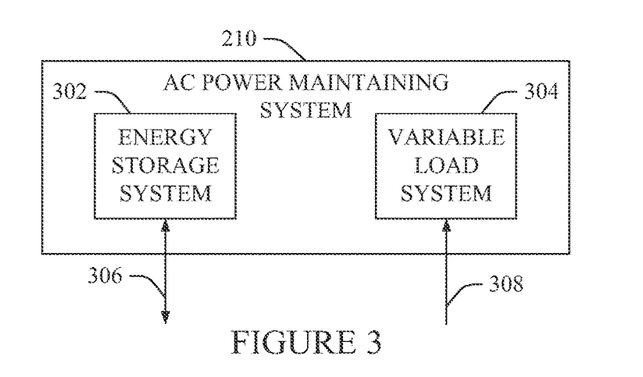
FIG. 3 schematically illustrates an example of the power maintaining system, in accordance with an embodiment(s) herein.

FIG. 3 schematically illustrates an example of the AC power maintaining system 210 of FIG. 2. In the illustrated embodiment, the AC power maintaining system 210 includes the energy storage system 302 and the variable load system 304. The energy storage system 302 includes a bidirectional AC power path 306 for supplying AC power to the AC power line 206 and/or the power grid 204 (FIG. 3) and/or receiving AC power from the AC power line 206 and/or the power grid 204. The variable load system 304 includes an unidirectional AC power path 308 for receiving AC power from the AC power line 206 and/or the power grid 204.

In one instance, the energy storage system 302 supplies AC power to the AC power line 206 and/or the power grid 204 via the AC power path 306, e.g., when a load is applied or increased, which maintains the AC power at the AC power grid 204 until the AC power generating system 202 adjusts or adapts to the new AC power draw. In another instance, the energy storage system 202 receives AC power from the AC power line 206 and/or the AC power grid 204 over the AC power path 306, e.g., when a load is removed or decreased, which maintains the AC power at the AC power grid 204 until the power generating system 202 adjusts to the new AC power draw.

The variable load system 304 receives AC power from the AC power line 206 and/or the AC power grid 204 over the AC power path 308, e.g., when a load is removed or decreased, which maintains the AC power at the grid 204 until the power generating system 202 adjusts to the new AC power draw. In one instance, the variable load system 304 receives the AC power when the energy storage system 302 is unable to receive AC power from the power grid 204, e.g., when it has reached its maximum charge capacity, with the energy storage system 302, e.g., in a shared manner (equally or unequally), and/or otherwise.

In another instance, the energy storage system 302 includes separate unidirectional AC power paths for supplying and receiving AC power. As discussed in greater detail below, in another instance, the energy storage system 302 instead includes only a unidirectional AC power path for the supplying AC power to the AC power line 206 and/or the power grid 204 and the variable load system 304 receives the AC power from the AC power line 206 and/or the power grid 204. As discussed in greater detail below, in another instance, the variable load system 304 is omitted and the energy storage system 302 both supplies AC power to and receives AC power from the AC power line 206 and/or the power grid 204.

Figure 4:
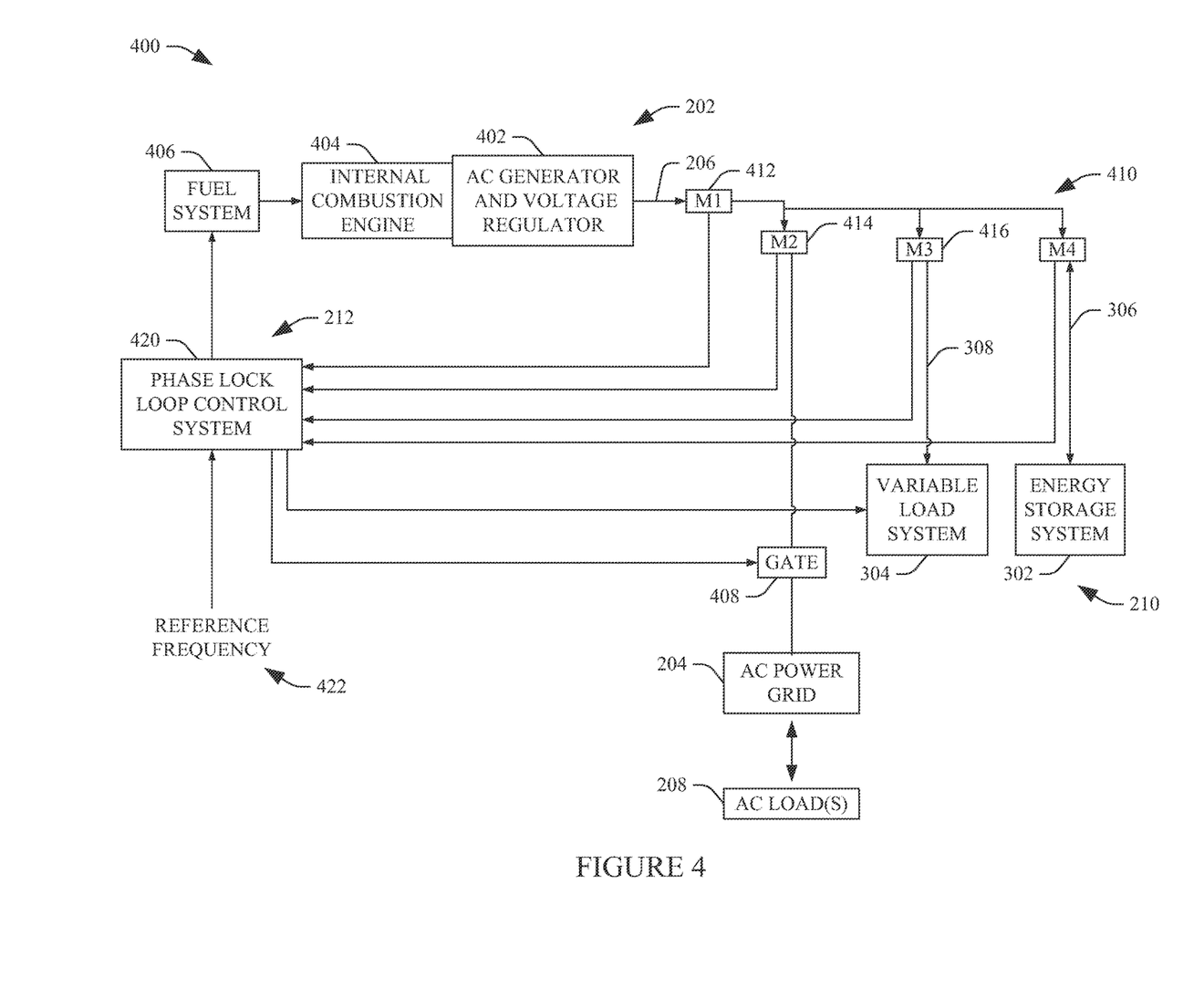
FIG. 4 schematically illustrates an example of the system of FIG. 2, in accordance with an embodiment(s) herein.

FIG. 4 schematically illustrate a non-limiting example 400 of the system 200 (FIG. 2). In this example, the AC power generating system 202 includes an AC generator and a voltage regulator 402 (also referred to as "power generator 402" herein), an internal combustion (gas or diesel) engine 404, and a fuel system 406. In the illustrated embodiment, the AC generator and voltage regulator 402 are integrated into a single system. In another example, the AC generator and the voltage regulator 402 are separate systems. The internal combustion engine 404 and the power generator 402 are in mechanical communication via a rotatable shaft(s) and/or otherwise.

The fuel system 406 includes a fuel tank, a pump, a line, a valve, etc. The fuel tank is configured to hold the fuel for the internal combustion engine 404. The pump is configured to pump fuel from the fuel tank to the internal combustion engine 404 via the fuel line. The fuel valve controls a flow of fuel from the tank to the internal combustion engine 404. The internal combustion engine 404 converts energy from combustion of the supplied fuel to mechanical energy, e.g., a rotatable shaft. The power generator 402 receives the mechanical energy, e.g., a rotating shaft coupled to the rotating shaft of the internal combustion engine 404, and converts the mechanical energy to AC power and outputs the AC power.

The power generator 402 supplies the AC power via the AC power line 206 to the AC power grid 204. In the illustrated embodiment, a gate 408 is in a path of the AC power line 206 between the power generator 402 and the AC power grid 204. The gate 408 controls when AC power is supplied to the AC power grid 204. As discussed herein, the AC power grid 204 supplies AC power to the AC load(s) 208, which includes at least one transient load, e.g., a load that suddenly increases and/or suddenly decreases, changing power demand on the power generator 402, which, without the power maintaining system 210 and the controller 212, would otherwise cause (e.g., voltage and frequency) variations in the AC power supplied to the AC load(s) 208.

The AC power maintaining system 210 includes the energy storage system 302 and the variable load system 304 described in connection with FIG. 3. In other embodiments, the AC power maintaining system 210 includes the energy storage system 302 and/or the variable load system 304 described in connection with FIGS. 12 and/or 13. The energy storage system 302 and the variable load system 304 are in electrical communication with the AC power line 206. The energy storage system 302 is configured to supply power to AC power line 206 when a load is applied or increased and receive power from the AC power line 206 when a load is removed or decreased. The variable load system 304 is configured to receive power from the AC power line 206 when a load is removed or decreased.

The system further includes a plurality of AC power meters 410, including a meter (M1) 412, a meter (M2) 414, a meter (M3) 416, and a meter (M4) 418. The meter (M1) 412 is directly in the AC power line 206 at the output of the AC power generator 402. The meter (M2) 414 is in the AC power line 206 between the meter (M1) 412 and the gate 408 to the AC power grid 204. The meter (M3) 416 is in the AC power line 206 between the meter (M1) 412 and the variable load system 304. The meter (M4) 418 is in the AC power line 206 between the meter (M1) 412 and the energy storage system 302. Each of the meters 410 is configured to measure a real power at a particular node in the AC power line 206.

For 3-phase 60 Hz, in one embodiment each of the meters 410 includes three transformers, one for each phase, and feeds the voltages across secondary resistors. For each of the meters 410, the current signals are combined with the common output voltages of the generator to compute a wattage of power that is flowing through that point. For illustrated energy storage system 302, the meter M4 418 measures power flowing into the energy storage system 302 when the energy storage system 302 is receiving power from the AC power line 206, and out of the energy storage system 302 when the energy storage system 302 is supplying power to the AC power line 206.

In one instance, at least one of the meters 410 (e.g., the meter M2 414, etc.) is configured to implement a two watt-meter method for measuring a direction and a magnitude of the instantaneous power flow at the meter(s). For such metering, the hardware may include multiple current transformers (CTs) and multiple potential transformers (PTs). The CTs and PTs generate low level analog signals processed by an integrated chip (IC), an application specific integrated chip (ASIC), etc. to produce an analog signal output that can drive the input to the controller 212.

In one instance, the low level analog signals indicate instantaneous magnitude and direction of power flow (e.g., in units of watts) at all times of power flow to/from the energy storage system 302. Off-the-shelf and/or other power measuring instrument can be utilized. For example, in one instance M4 418 includes a power measuring instrument of EKM METERING®, a corporation of Santa Cruz, California, USA. A suitable power measuring instrument uses two external CTs, selected burden resistors, and a high to low voltage, 3-phase, Delta to Delta isolation external step down transformer as input sensors. Other 2-wattmeter approaches and/or other approaches are also contemplated herein.

The controller 212 includes a phase lock loop control system 420. The phase lock loop control system 420 receives, as input, the measured real power from one or more of the power meters 410, including the meter (M1) 412, the meter (M2) 414, the meter (M3) 416, and/or the meter (M4) 418. The phase lock loop control system 420 further receives, as input, a reference frequency 422 (e.g., 60 Hz in the USA, 50 Hz, etc.). The phase lock loop control system 420 is configured to control the fuel system 406, the gate 408, the variable load system 304, etc., e.g., based on one or more of the received measured real power signals from the power meters 410 and the reference frequency 422.

Figure 5:
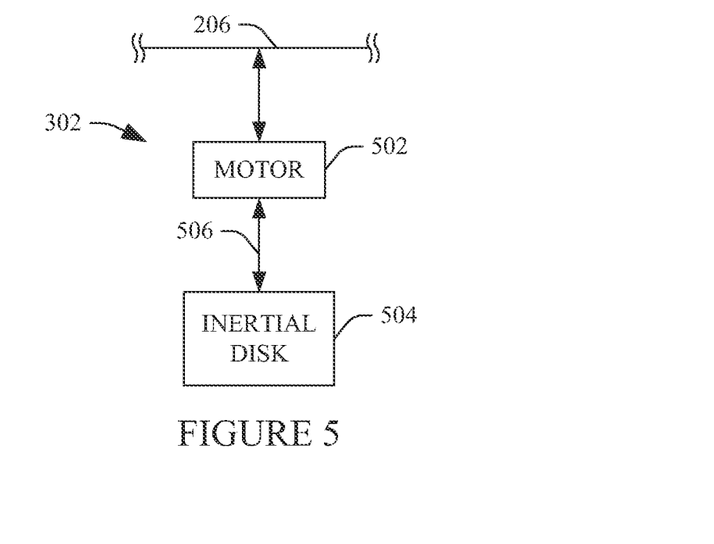
FIG. 5 schematically illustrates an example of the energy storage system, in accordance with an embodiment(s) herein.

FIG. 5 schematically illustrates a non-limiting example of the energy storage system 302. In the illustrated embodiment, the energy storage system 302 includes a motor 502 and an inertial disk 504. The motor 502 is in bidirectional electrical communication with AC power line 206 and in bidirectional electrical communication with inertial disk 504 via a path 506.

In one instance, the motor 502 includes an induction motor. Examples of suitable induction motors include wound or squirrel-cage induction motors. An induction motor can be used for both 3-phase and single phase implementations. A suitable motor design includes a National Electrical Manufacturers Association (NEMA) design such as a NEMA D type motor or other motor with a high locked rotor/zero speed. Other motors, including other induction motor and motors other than induction motors, are also contemplated herein.

In one instance, the inertial disk 504 includes a flywheel or other system that works by accelerating a rotor (flywheel) to a very high speed and maintaining the energy in the system as rotational energy. When energy is extracted, the flywheel's rotational speed is reduced as a consequence of the principle of conservation of energy. When energy is added, the flywheel's rotational speed is increased as a consequence of the principle of conservation of energy. In one instance, the inertial disk 504 includes a front wheel of a motorcycle.

Figure 6:
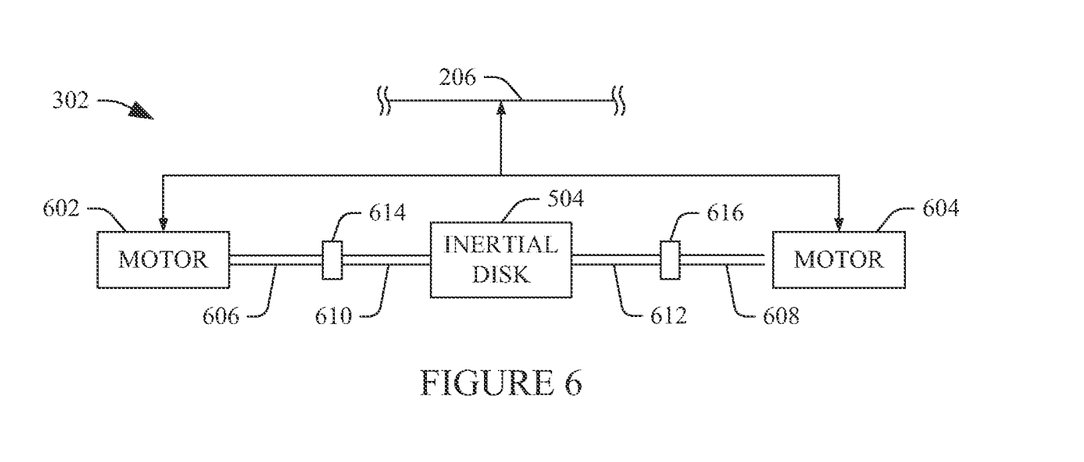
FIG. 6 schematically illustrates another example of the energy storage system, in accordance with an embodiment(s) herein.

FIG. 6 schematically illustrate another non-limiting example of energy storage system 302 is schematically illustrated. In this example, the motor 502 (FIG. 5) includes a first motor 602 and a second motor 604. The motor 602 has a shaft 606, and the motor 604 has a shaft 608. The inertial disk 504 includes a shaft 610 and a shaft 612. A coupling 614 couples the shaft 606 of the motor 602 to the shaft 610 of the inertial disk 504, and a coupling 616 couples the shaft 608 of the motor 604 to the shaft 612 of the inertial disk 504. The motors 602 and 604 can be identical motors (e.g., equal size in terms of power output at the shaft) or different motors.

Figure 7:
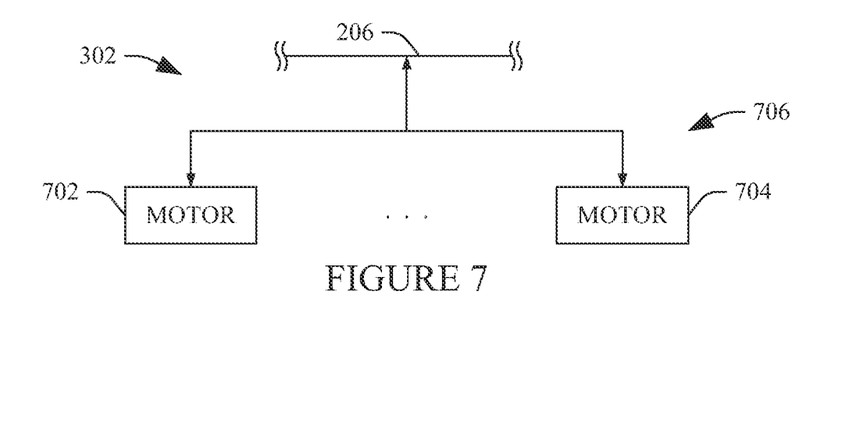
FIG. 7 schematically illustrates yet another example of the energy storage system, in accordance with an embodiment(s) herein.

FIG. 7 schematically illustrate another non-limiting example of energy storage system 302. In this example, the motor 502 (FIG. 5) includes N motors, including a first motor 702, ..., and an Nth motor 704 (also referred to as motors 706 herein), wherein N is a positive integer equal to or greater than one. One or more of the motors 706 can be identical motors (e.g., equal size in terms of power output at the shaft) or different motors. In the illustrated embodiment, there is no inertial disk. The motors 706 themselves provide sufficient inertia. In one instance, ganging up multiple motors will reduce overall system cost relative to using one large motor. It may also make the packaging of the system easier. In another embodiment, one or more of the motors 706 is coupled to one or more inertial disks as described herein.

Figure 8:
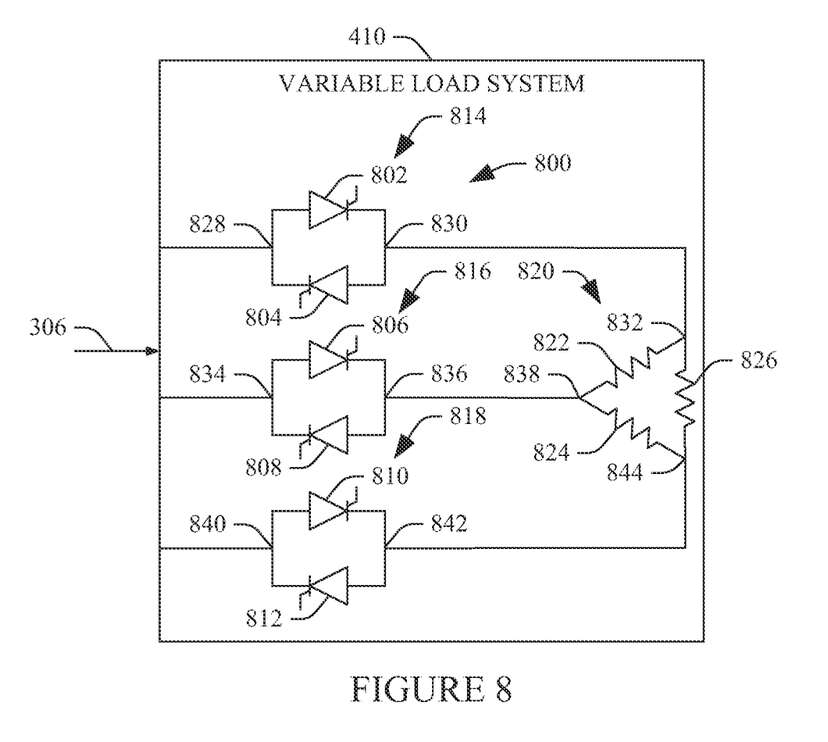
FIG. 8 schematically illustrates an example of the variable load system, in accordance with an embodiment(s) herein.

FIG. 8 schematically illustrates a non-limiting example of the variable load system 304. In this example, the variable load system 304 is configured for phase-angle control. The variable load system 304 includes in-line phase controlled silicon controlled rectifier (SCR) 800. The illustrated embodiment includes six (6) SCR's 802, 804, 806, 808, 810, and 812, including three pairs of SCRs 814, 816, and 818, each of the pairs of SCRs 814, 816, and 818 including two SCRs electrically arranged back-to-back in parallel, and in electrical communication with a resistive load 820, which includes a resistor bank configured in a "delta" (Δ) configuration, including a first branch 822, a second branch 824, and a third branch 826.

The first pair of parallel SCRs 814 includes the SCRs 802 and 804, with one end 828 in electrical communication with one phase of the 3-phase AC power and an opposing end 830 in electrical communication with a junction 832 between branches 822 and 826 of the load 820. The second pair of parallel SCRs 816 includes the SCRs 806 and 808, with one end 834 in electrical communication with one phase of the 3-phase AC power and an opposing end 836 in electrical communication with a junction 838 between branches 822 and 824 of the load 820. The third pair of parallel SCRs 818 includes the SCRs 810 and 812, with one end 840 in electrical communication with one phase of the 3-phase AC power and an opposing end 842 in electrical communication with a junction 844 between branches 826 and 824 of the load 820.

Figure 9:
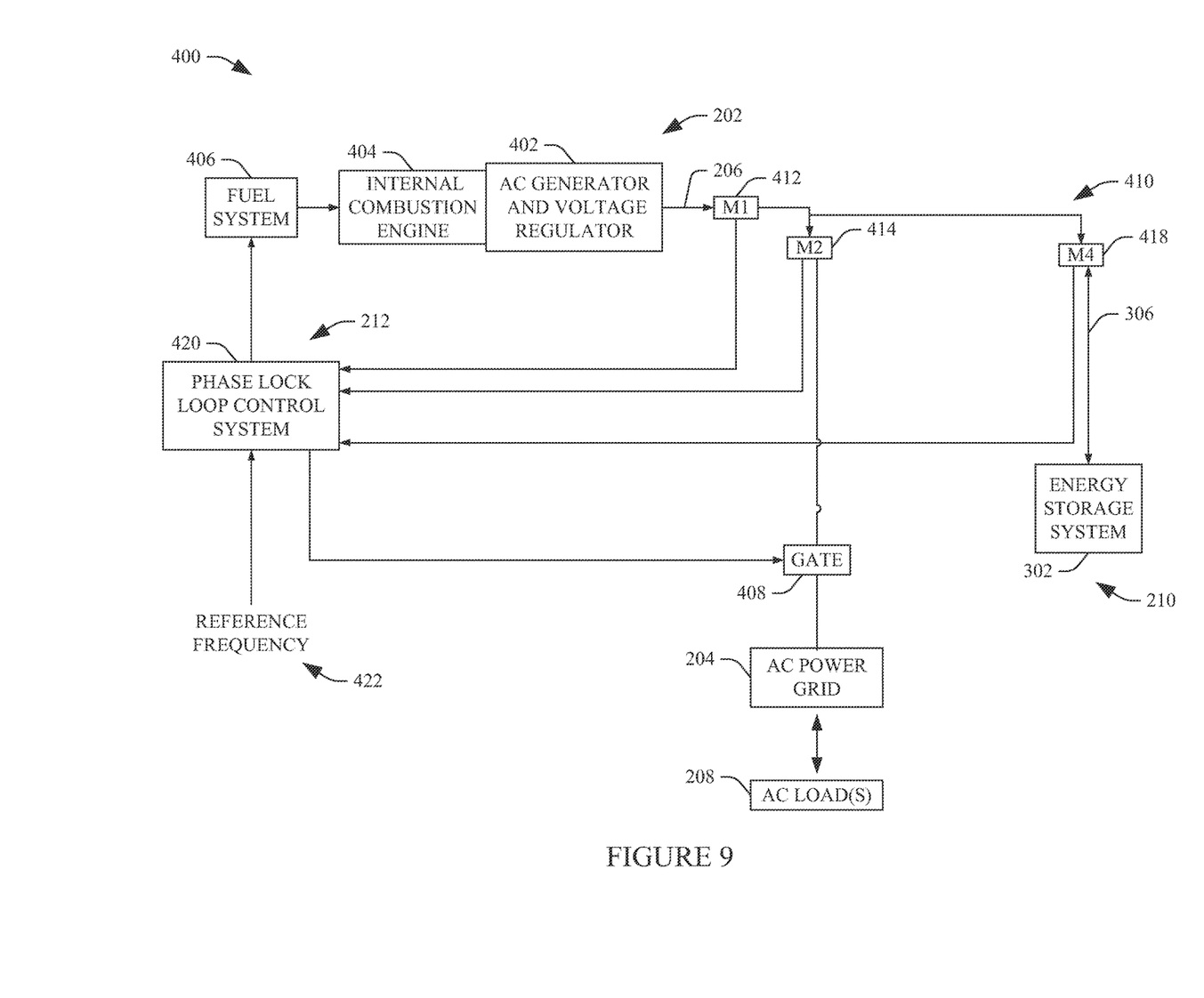
FIG. 9 schematically illustrates a variation of FIG. 4, in accordance with an embodiment(s) herein.

FIG. 9 schematically illustrates a variation of the system 400 of FIG. 4. In this variation, the system 400 does not include the variable load system 304 and the meter (M3) 416. With this variation, the phase lock loop control system 420 receives, as input, the measured real power from one or more of the power meters 410, including the meter (M1) 412, the meter (M2) 414, and/or the meter (M4) 418, as well as the reference frequency 422. The phase lock loop control system 420 is configured to control the fuel system 406, the gate 408, the variable load system 304, etc., e.g., based on one or more of the received measured real power signals from the power meters 410 and the reference frequency 422.

In another instance, the variable load system 304 includes a combination of the examples described in connection with FIGS. 8 and 9 and/or other configuration.

Figure 10:
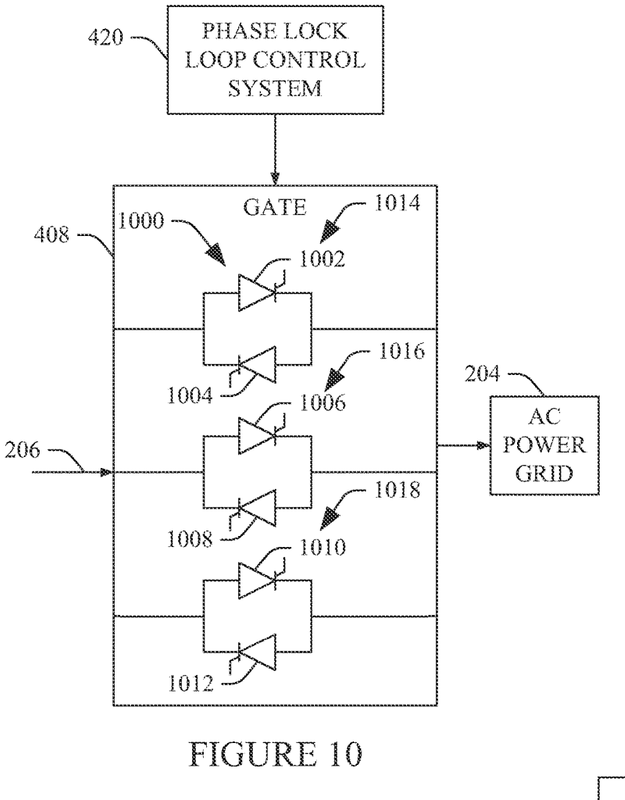
FIG. 10 schematically illustrates an example of the gate, in accordance with an embodiment(s) herein.

FIG. 10 schematically illustrate a non-limiting example of the gate 408. The gate 408 includes silicon controlled rectifiers (SCRs) 1000, including a SCR 1002, a SCR 1004, a SCR 1006, a SCR 1008, a SCR 1010, and a SCR 1012, including three pairs of SCRs 1014, 1016, and 1018, respectfully including two SCRs electrically arranged back-to-back in parallel, and in electrical communication with the AC power line 206 and the power grid 204. The pair of SCRs 1014 includes SCR 1002 and the SCR 1004, the pair of SCRs 1016 includes SCR 1006 and SCR 1008, and the pair of SCRs 1018 includes the SCR 1010 and the SCR 1012. The phase lock loop control system 420 controls the gate 408 as described herein.

Figure 11:
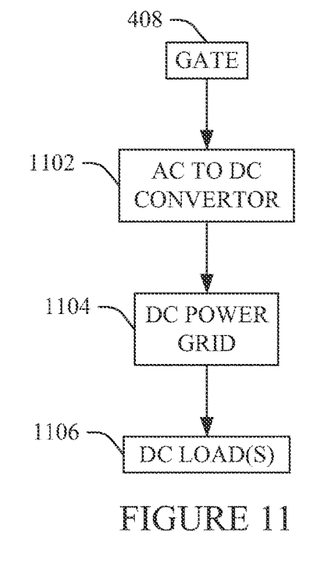
FIG. 11 schematically illustrates an alternative embodiment configured for supplying DC power, in accordance with an embodiment(s) herein.

FIG. 11 schematically illustrates an alternative embodiment configured for supplying DC power. In this example, the gate 408 feeds the AC power to an AC to DC converter 1102. In one instance, the AC to DC converter 1102 includes a transformer and a rectifier configured to convert the input AC power to DC power. The DC power is fed to a DC power grid 1104, which supplies power to a DC load(s) 1106. FIG. 4 can further include this embodiment so as to provide both AC and DC power, or include this embodiment in place of the AC power grid 204 and the AC load(s) 208.

Figure 12:
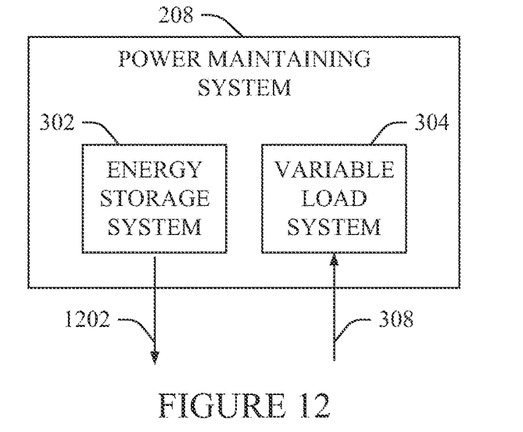
FIG. 12 schematically illustrates an example of the power maintaining system, in accordance with an embodiment(s) herein.

FIG. 12 illustrates alternative embodiment of the power maintaining system 210 of FIGS. 3 and 4. In FIGS. 3 and 4, the energy storage system 302 is in electrical communication with the AC power line 206 via the bidirectional path 306. In FIG. 12, the energy storage system 302 is in electrical communication with the AC power line 206 via a unidirectional path 1202. In this embodiment, the energy storage system 302 supplies AC power to the power grid 204 over the AC power path 1202, e.g., when a load is applied or increased, which maintains the AC power at the grid 204 until the power generating system 202 adjusts to the new AC power draw. The variable load system 304 receives AC power from the power grid 204 over the AC power path 308, as described herein in connection with FIGS. 3 and 4.

Figure 13:
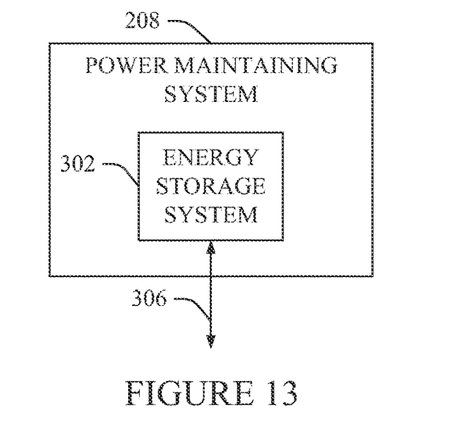
FIG. 13 schematically illustrates another example of the power maintaining system, in accordance with an embodiment(s) herein.

FIG. 13 illustrates another alternative embodiment of the power maintaining system 210 of FIGS. 3 and 4. In FIGS. 3 and 4, the energy storage system 302 is in electrical communication with the AC power line 206 via the bidirectional path 306, as described herein in connection with FIG. 3. The embodiment of FIG. 13 includes this same implementation. However, power maintaining system 210 of FIGS. 3 and 4 further includes the variable load system 304. In this example, the variable load system 304 is omitted. In this embodiment, the energy storage system 302 supplies AC power to the power grid 204 over the AC power path 306 and receives AC power from the AC power grid 204 over the AC power path 306, as described herein in connection with FIGS. 3 and 4.

Figure 14:
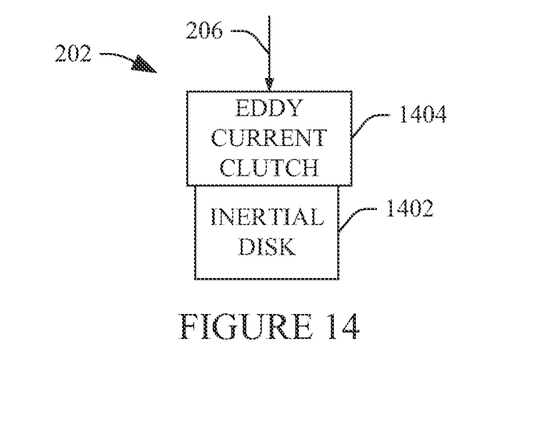
FIG. 14 schematically illustrates still another example of the energy storage system, in accordance with an embodiment(s) herein.

FIG. 14 schematically illustrate another non-limiting example of the energy storage system 302. In this embodiment, the energy storage system 302 includes a rotary inertial disk 1402 connected to an Eddy current clutch 1404 via a shaft (not visible). With this configuration, in one non-limiting embodiment, there will be a non-working start-up mode in which the Eddy current clutch 1404 will gradually increase a speed of the shaft to the rotary inertial disk 1402 until the torque loss across the Eddy current clutch 1404 is within a predetermined range.

Once the torque loss is within the predetermined range, the energy storage system 302 can enter start mode. In start mode, the Eddy current clutch 1404 remains generally full on. However, in some embodiments, the field current may be slightly reduced from full on, e.g., to avoid an overshoot in the speed of the shaft. In response to an electrical load increase, transient electrical backloading from the generator will be compensated by a combination of the shaft coupled inertias of the power generating system 202 and the rotary inertial disk 1402.

Figure 15:
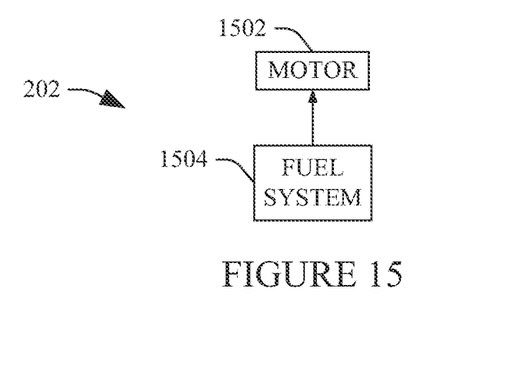
FIG. 15 schematically illustrates another example of the energy storage system, in accordance with an embodiment(s) herein.

FIG. 15 schematically illustrate a non-limiting example of the energy storage system 302. The energy storage system 302 includes a motor 1502. In this example, the motor 1502 is an internal combustion engine. The energy storage system 302 further includes a fuel system 1504 configured to store fuel for the motor 1502. The energy storage system 302 further includes a fuel pump configured to supply fuel from the fuel system 1504 to the motor 1502.

The controller 212 is configured to receive power output by the power generating system 202 and control the fuel pump based thereon. Such control includes supplying no fuel to the motor 1502, e.g., the power generating system 202 is operating at steady state, and fuel to the motor 1502, e.g., when a load is applied or increased and the output power of the power generating system 202 falls outside of predetermined operating conditions. In the latter case, the motor 1502 is used to supplement the power generating system 202.

Figure 16:
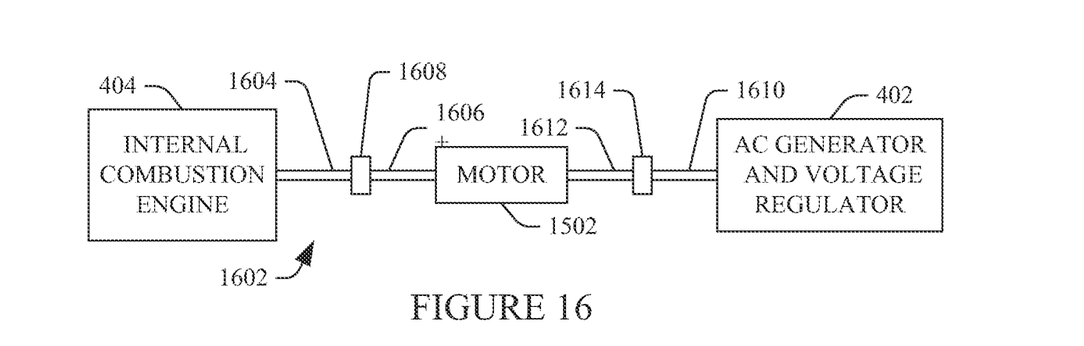
FIG. 16 schematically illustrates an example of the energy storage system of FIG. 15, in accordance with an embodiment(s) herein.

A non-limiting example of the system of FIG. 15 is schematically illustrated in FIG. 16, which shows the internal combustion engine 404 of the power generating system 202 (FIG. 4) and the power generator 402 (FIG. 4), including an AC generator with a voltage regulator integrated therewith. In another instance, the AC generator and the voltage regulator are separate devices. In this example, the motor 1502 (FIG. 15) is disposed on a shaft 1608 between the internal combustion engine 404 and the power generator 402.

More particularly, the internal combustion engine 404 includes a shaft 1604, the motor 1502 includes a shaft 1606, and a coupling 1608 couples the shaft 1604 from the internal combustion engine 404 to the shaft 1608 from the motor 1502. In addition, the power generator 402 includes a shaft 1610, the motor 1502 includes a shaft 1612, and a coupling 1614 couples the shaft 1610 from the power generator 402 to the shaft 1612 from the first motor 1502.

Figure 17:
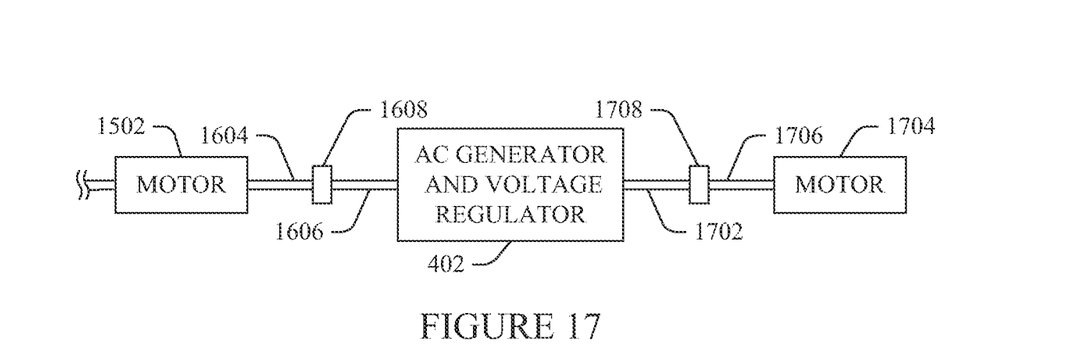
FIG. 17 schematically illustrates another example of the energy storage system of FIG. 15, in accordance with an embodiment(s) herein.

Another non-limiting example of the system of FIG. 15 is schematically illustrated in FIG. 17. The example of FIG. 17 is substantially similar to the example of FIG. 16 except that in the example of FIG. 17 the power generator 402 includes another shaft 1702, and the example further includes another motor 1704 with a shaft 1706, and a coupling 1708 configured to couple the shaft 1702 from the power generator 402 to the shaft 1706 from the motor 1704. The motor 1502 and the motor 1704 can be identical motors (e.g., equal size in terms of power output at the shaft) or different motors.

Figure 18:
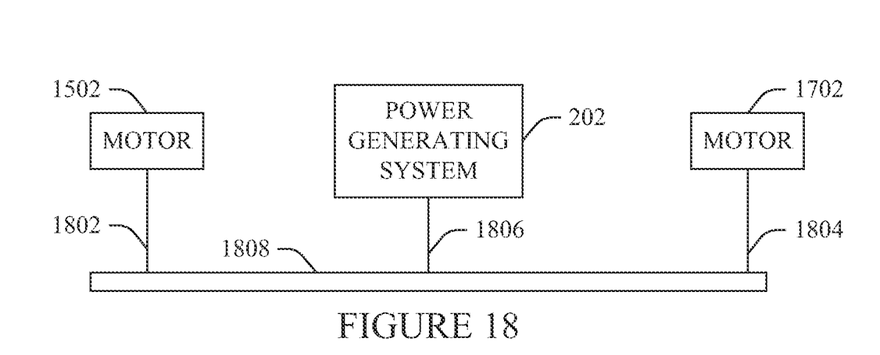
FIG. 18 schematically illustrates another example of the energy storage system of FIG. 17, in accordance with an embodiment(s) herein.

FIG. 18 schematically illustrates an alternative embodiment to FIG. 17. The example of FIG. 18 is substantially similar to the example of FIG. 17, but shows an alternative coupling. In this example, the motor 1502 includes a shaft 1802, the power generating system 202 (the AC generator with the voltage regulator 402) includes a shaft 1806, and the motor 1702 includes a shaft 1804. A coupling 1808 couples the shafts 1802, 1804, and 1806. Examples of suitable couplings includes a chain drive, a belt drive, a gear drive, etc. In one instance, the same fuel system will supply fuel to the motors 1502 and 1702, and the controller 212 will control such flow. In another instance, different fuel system will provide fuel to the different motors 1502 and 1702.

Figure 19:
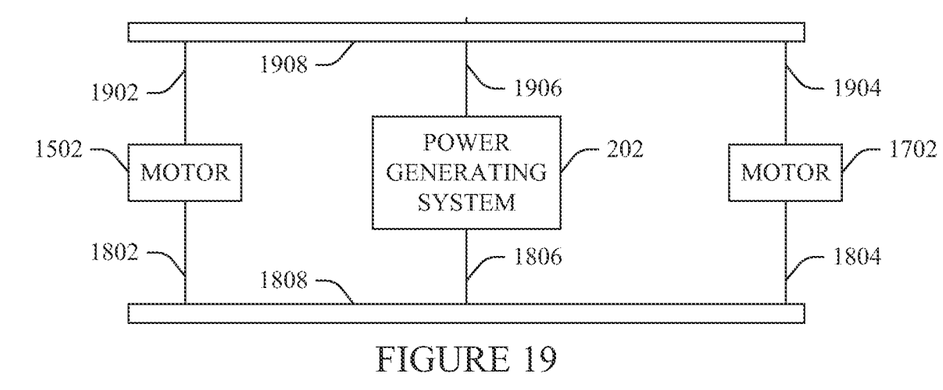
FIG. 19 schematically illustrates yet another example of the energy storage system of FIG. 17, in accordance with an embodiment(s) herein.

FIG. 19 schematically illustrates an alternative embodiment to FIG. 18. The example of FIG. 19 is substantially similar to the example of FIG. 18, but shows an additional coupling. In this example, the motor 1502 further includes another shaft 1902, the motor 1702 further includes another shaft 1904, and the power generating system 202 (the AC generator with the integrated voltage regulator 402) includes another shaft 1906, where another coupling 1908 couples the shafts 1902, 1904, and 1906. Similarly, examples of suitable couplings includes a chain drive, a belt drive, a gear drive, etc.

Another non-limiting example includes a combination of two or more of the examples described in connection with FIGS. 14-19 and/or other configuration.

Figure 20:
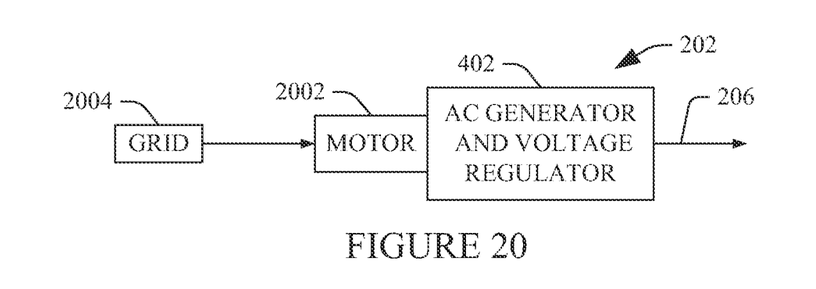
FIG. 20 schematically illustrates another example of the power generating system, in accordance with an embodiment(s) herein.
Figure 21:
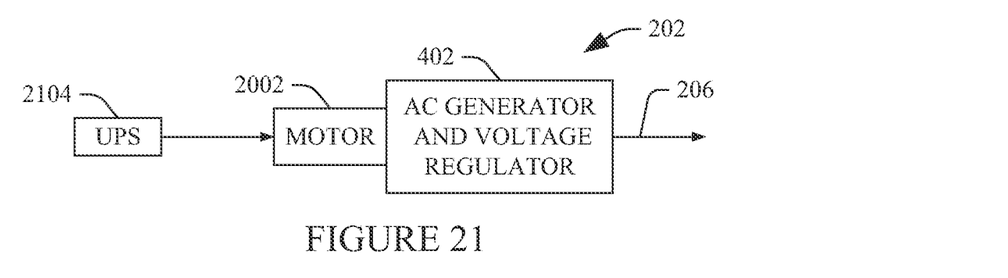
FIG. 21 schematically illustrates yet another example of the power generating system, in accordance with an embodiment(s) herein.
Figure 22:
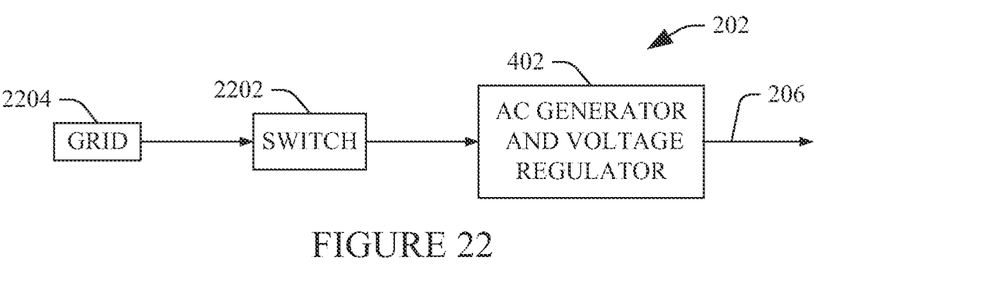
FIG. 22 schematically illustrates still another example of the power generating system, in accordance with an embodiment(s) herein.
Figure 23:
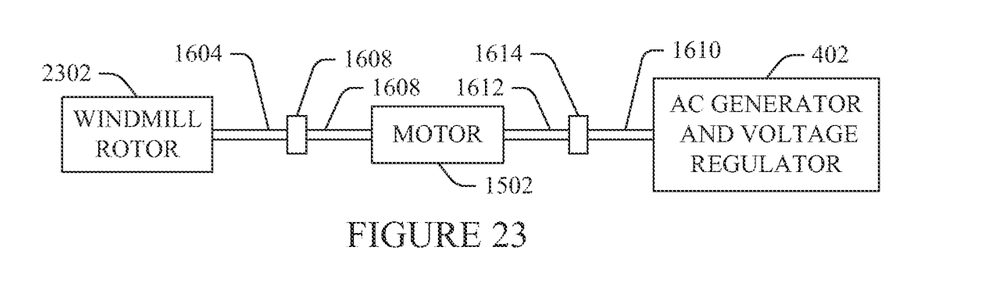
FIG. 23 schematically illustrates again another example of the power generating system, in accordance with an embodiment(s) herein.

FIGS. 20, 21 and 22 show other examples of the power generating system 202. In FIG. 4, the power generating system 202 includes the power generator 402, the internal combustion engine 404, and the fuel system. In FIG. 20, the power generating system 202 instead include an electric motor 2002 driven by grid 2004 power. In FIG. 21, the power generating system 202 instead include the electric motor 2002 driven by a universal power supply (UPS) 2104. In FIG. 22, the power generating system 202 instead include a switch 2202 and a grid 2204 power. FIG. 23 is similar to FIG. 16 except that it includes a windmill rotor 2302 instead of the internal combustion engine 404 as the primary source.

Figure 24:
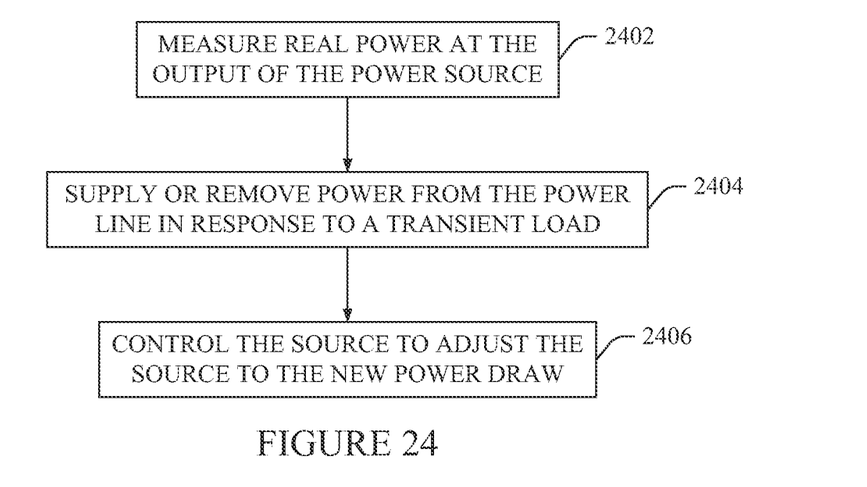
FIG. 24 illustrates an example method, in accordance with an embodiment(s) herein.

FIG. 24 discloses a method. It is to be appreciated that the ordering of the acts of the method is not limiting. As such, other orderings are contemplated herein. In addition, one or more acts may be omitted, and/or one or more additional acts may be included. At 2402, a real AC power at an output of a source of AC power for an AC power line is measured. At 2404, AC power from an energy storage system is supplied to or removed from the AC power line based on the measured power in response to a change in the power draw due to a transient load. At 2406 the source of the AC power to the AC power line is controlled based on the measured real powers to maintain a target AC power level on the AC power line.

The following provides a non-limiting example of a startup sequence for the example of FIG. 4 where all the low level logic is already on. For this example, the gate 408 includes the gate described in connection with FIG. 10. and the energy storage system 302 includes the motor(s) and an inertial disk(s) (described below in connection with FIG. 5).

During a first (or startup) phase, the phase lock loop control 420 opens the fuel valve, the pump pumps fuel to the internal combustion engine 404, and the internal combustion engine 404 starts. The AC generator 402 slowly ramps-up to a sinusoidal with a voltage at a frequency dependent on its shaft speed. At this time, there is zero or no output voltage for the load(s) 208 at least because the gate 408 is off/not yet gated, and the variable load system 304 is not actuated. However, the 3-phase AC voltage from the power generator 402 is applied to the stators of the motor(s) of the energy storage system 302. Since the motor(s) begins in a "locked rotor" state, a magnetic flux to their rotor is at its maximum. This produces a large rotary torque in the motor(s).

This causes a rapid acceleration of the rotor (and any connected inertial disk). At this point, the meter M4 418 will measure a large power flow into the stators. This metering signal will increase to a positive power value. As the rotor(s) accelerates, the measured power signal will decrease to a lower, but still positive value to account for the friction and wind age losses. During this phase, the phase lock loop control 420 determines an absolute value of the power from the magnitude of the power measured by the fourth meter M4 418 and uses the absolute power to control the fuel system 406 to control flow of fuel to the internal combustion engine 404. At this point, the first phase has been completed.

In a second (or hold/wait) phase, the system waits for an external start signal to begin a third (or operational) phase. An example of the external start signal includes a timer block that sends a start next phase signal after lapse of a predetermined time period (e.g., T seconds) from the start of the hold phase. Another example of the external start signal includes a signal from an external command/control point to start a third phase. In the third phase, the phase lock loop control system 420 is driven primarily by these signals from the meters 410, and not by any actual phase angle shifts of the power generator 402. The phase lock loop control system 420 will control the only fuel flow to the internal combustion engine 404, so that it can slowly synchronize to the external reference (sine wave) frequency for any change in the load(s) 208.

During the third phase, the gate 408 is phased on, e.g., beginning at a minimum gating angle. The gating angle is moved slowly forward until all six SCRs are fully on. The 3-phase output voltage of the power generator 402 is now applied to the load(s) 208. This slow phase-on will suppress any tendency of the connected load(s) 208 to draw a large transient inrush current. The meter M4 418 will show a reversed power flow out the motor(s) as the inertia energy of the rotors aids the shaft torque. This power flow will be a transient flow that will die off as the phase lock loop control system 420 commands more fuel to the internal combustion engine 404. The second meter M2 414 will show a total instantaneous power flow to the load(s) 208 that is a sum of an inertial power and the engine power.

If the load(s) 208 decreases, the meter M2 414 measures the decrease, and the phase lock loop control system 420 phase on the variable load system 304 to compensate for this loss. Thereafter, the phase lock loop control system 420 will slowly phase back the variable load system 304, allowing the phase lock loop control system 420 to adjust fuel flow to the internal combustion engine 404. In either case, the actual power flow from the power generator 402 does include any sudden change. Rather, the fuel demand of the internal combustion engine 404 slowly changes.

Optionally, the meter M2 414 can be configured so that if the load(s) 208 should short circuit, the meter M2 414 will sense that the absolute value of any of the three currents has exceeded a setpoint limit and will stop any further gating of all of the SCRS in the gate 408. Optionally, the meter M2 414 can be configured to sense back fed power from the load(s) 208 and stop gating of all of the SCRS in the gate 408, and remain stopped, e.g., until cleared by maintenance personnel.

The following describes a non-limiting variation for a mechanical semi-UPS application. The variation uses a spinning disk box's stored inertial energy to hold up the critical load. This embodiment can eliminate known (e.g., size, fire prone, limited number of cycles, etc.) and/or other issues introduced by use of a battery use. This embodiment is well-suited for smaller end user points where Power distribution units (PDUs) are used, all of which can and do function well without any front end UPS. This mechanical semi UPS can protect critical application PDU sites, such as telecom and SCADA locations, for enough time for fast open-transfer of fast mechanical switches to be used. The semi mechanical opening time is easily covered by the spinning disks ability to carry the critical PDU until the other side of the transfer switch seats into its contacts.

The following describes a non-limiting variation for a drill application (and is also amenable to other applications such as laser cutting, communications, high power weapons, etc.). An example of such a drill application includes, but is not limited to, a site where a drill machine has to bore out a hole or tunnel in some rock filled hill, where the drill platform pushes slowly into the rock a few feet, then slowly retreats for a period of time, before repeating the cycle until the job is finished. The platform is connected to a local (e.g., 480 V 60 Hz hertz or other) port, and the port is the source of the platforms horizontal motion.

Such an application can be a high horsepower application, utilizing a large circuit breaker, multiple SCRs in two on/off switches, and a spinning disk subsystem. The platform's two-dimensional or three dimensional motion in the different directions is designed to give the spinning disk adequate time to recharge back to design full revolutions per minute (RPM) speed before the next drill run. In one instance, there is no charge cost, just a kilowatt-hour charge. The spinning disk energy transfer on impact mitigates demand charge that would otherwise by determined by the drill bit motor impact of any given pass.

In one instance, the system will include multiple spinning disks, each with its own SCR-based gate. Operation begins a single pass with of the SCR-based gates "on." In another instance, at least one of the SCR-based gates is not "on." As the drill progresses and the revolutions per minute (rpm) drops, one by one each of the SCR-based gates is opened. This may change the time dynamics of first order exponential slowdown. In another instance, more than one SCR-based gate can be opened together. Once opened, the SCR-based gate remains opens and is not closed.

In a configuration where a six-SCR gate is either in a full on or a full off connection of a rotary disk assembly of a motor to a voltage source, a large inrush current transient may occur. With such a configuration, a "soft" start feature can be employed. With this feature, instead of going full on in one step from off, the phase on angle is gradually moved forward to the full on position. In one instance, this can be implemented by including an analog printed circuit in a common logic box that receives a "turn on" command and then performs a 1-10 second (e.g., a 3 second, a 5 second, etc.) progressive movement of each SCR gate until all six-SCRs are full on.

The above method(s) described herein can be implemented by way of computer readable instructions, encoded, or embedded on the computer readable storage medium, which, when executed by a computer processor, cause the processor to carry out the described acts or functions. Additionally, or alternatively, at least one of the computer readable instructions is carried out by a signal, carrier wave or other transitory medium, which is not computer readable storage medium.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to an advantage.

What is claimed is:

1. A system, comprising:
   a first AC power meter configured to measure a first real AC power at an output of a source of AC power on an AC power line;
   an energy storage system configured to at least supply AC power to the AC power line;
   a second AC power meter configured to measure a second real AC power at a junction between the energy storage system and an AC power line;
   a first direct AC electrical path from the energy storage system through the second AC power meter to the AC power line; and
   a controller configured to control the source of the AC power to the AC power line based on the measured first real power and the measured second real power to maintain the target AC power level on the AC power line.

2. The system of claim 1, wherein the controller is configured to increase power production by the source of the AC power in response to an increased demand in the AC power on the AC power line.

3. The system of claim 2, wherein the source of the AC power includes an internal combustion engine and an AC power generator, and the controller is configured to increase a flow of fuel to the engine in response to the increased demand in the AC power from the AC power generator.

4. The system of claim 1, wherein the controller is configured to decrease power production by the source of the AC power in response to a decreased demand in the AC power on the AC power line.

5. The system of claim 4, wherein the source of the AC power includes an internal combustion engine and an AC power generator, and the controller is configured to decrease a flow of fuel to the engine in response to the decreased demand in the AC power from the AC power generator.

6. The system of claim 1, wherein the AC power line electrically connects the source of the AC power to an AC power grid, and the AC power line does not receive AC power from a power converter.

7. The system of claim 1, wherein the AC power line electrically connects the source of the AC power to an AC power grid, and the AC power line is not in electrical communication with a power converter configured to maintain system the output AC power requirements during transient loads.

8. The system of claim 1, wherein the energy storage system is further configured to receive AC power on the AC power line in excess of the target AC power level.

9. The system of claim 8, further comprising:
a variable load system configured to receive the excess AC power on the AC power line;
a third AC power meter configured to measure a third real AC power at a junction between the variable load system and the AC power line; and
a second direct AC electrical path from the variable load system through the third AC power meter to the AC power line,
wherein the controller is further configured to control the variable load system based on the measured first real power, the second measured power, and the measured third real power to maintain the target AC power level on the AC power line.

10. The system of claim 9, further comprising:
a gate configured to route the AC power on the AC power line to a power grid;
a fourth AC power meter configured to measure a fourth real AC power at a junction between the gate and the AC power line; and
a third direct AC electrical path from the gate through the fourth AC power meter to the AC power line;
wherein the controller is further configured to control the gate based on the measured first real power and the measured fourth real power.

11. The system of claim 1, further comprising:
an AC to DC converter configured to convert the output AC power to DC power and supply it to a DC power grid.

12. A method, comprising:
measuring a first real AC power at an output of a source of AC power for an AC power line;
supplying AC power from an energy storage system to the AC power line;
measuring a second real AC power at a junction between the energy storage system and the AC power line; and
controlling the source of the AC power to the AC power line based on the measured first real power and the measured second real power to maintain a target AC power level on the AC power line.

13. The method of claim 12, wherein the AC power line electrically connects the source of the AC power to an AC power grid, and the AC power line does not receive AC power from a power converter.

14. The method of claim 12, further comprising:
increasing power production by the source of the AC power in response to an increased demand in the AC power on the AC power line.

15. The method of claim 12, further comprising:
decreasing power production by the source of the AC power in response to an decreased demand in the AC power on the AC power line.

16. The method of claim 12, further comprising:
converting the output AC power to DC power; and
supplying the DC power to a DC power grid.

17. A computer-readable storage medium storing instructions that when executed by a processor cause the processor to:
measure a first real AC power at an output of a source of AC power for an AC power line;
measure a second real AC power at a junction between an energy storage system and the AC power line; and
control the source of the AC power to the AC power line based on the measured first real power and the measured second real power to maintain a target AC power level on the AC power line.

18. The computer-readable storage medium of claim 17, wherein the instructions further cause the processor to: increase power production by the source of the AC power in response to an increased demand in the AC power on the AC power line.

19. The computer-readable storage medium of claim 17, wherein the instructions further cause the processor to: decrease power production by the source of the AC power in response to an decreased demand in the AC power on the AC power line.

20. The computer-readable storage medium of claim 17, wherein the instructions further cause the processor to:
convert the output AC power to DC power; and
supply the DC power to a DC power grid.

* * * * *